US011913244B2

(12) United States Patent
Gienger

(10) Patent No.: US 11,913,244 B2
(45) Date of Patent: Feb. 27, 2024

(54) MONOPOLE WITH REINFORCED BASE

(71) Applicant: CommScope Technologies LLC, Hickory, NC (US)

(72) Inventor: Ulrich Gienger, Fairview, TX (US)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 520 days.

(21) Appl. No.: 17/168,434

(22) Filed: Feb. 5, 2021

(65) Prior Publication Data

US 2021/0262248 A1 Aug. 26, 2021

Related U.S. Application Data

(60) Provisional application No. 62/981,272, filed on Feb. 25, 2020.

(51) Int. Cl.

*E04H 12/22* (2006.01)
*E04H 12/08* (2006.01)
*H01Q 1/12* (2006.01)

(52) U.S. Cl.

CPC ......... *E04H 12/2292* (2013.01); *E04H 12/08* (2013.01); *E04H 12/085* (2013.01); *H01Q 1/1242* (2013.01)

(58) Field of Classification Search

CPC .............. E04H 12/2292; E04H 12/085; E04H 12/2269; H01Q 1/1242; E04G 23/0218; E02D 5/64

See application file for complete search history.

(56) References Cited

U.S. PATENT DOCUMENTS

| | | | | |
|---|---|---|---|---|
| 10,822,764 | B2 * | 11/2020 | Voss | E04H 12/34 |
| 2003/0163960 | A1 * | 9/2003 | Hadden | E04C 3/30 52/514 |
| 2018/0254545 | A1 | 9/2018 | Hendrix et al. | |
| 2020/0136236 | A1 | 4/2020 | Colapietro et al. | |
| 2021/0262248 | A1 * | 8/2021 | Gienger | E04H 12/08 |

* cited by examiner

*Primary Examiner* — Andrew J Triggs
(74) *Attorney, Agent, or Firm* — Myers Bigel, P.A.

(57) ABSTRACT

A base assembly for a monopole includes: an elongate monopole with a lower end; a base plate with a hole, the lower end of the monopole inserted into the hole; and a reinforcing ring encircling the lower end of the monopole, the reinforcing ring having upper and lower ends. A first weld is present between the upper end of the reinforcing ring and the monopole; a second weld is present between the lower end of the reinforcing ring, the base plate, and the monopole, and a third weld is present between the lower end of the monopole and an outer surface of the hole.

17 Claims, 4 Drawing Sheets

MONOPOLE WITH REINFORCED BASE

RELATED APPLICATION

The present application claims priority from and the benefit of U.S. Provisional Patent Application No. 62/981,272, filed Feb. 25, 2020, the disclosure of which is hereby incorporated herein by reference in full.

FIELD OF THE INVENTION

The present application is directed generally toward communication antennas, and more particularly to mounting structures for communications antennas.

BACKGROUND

As wireless data service demands have grown, a conventional response has been to increase the number and capacity of conventional cellular Base Stations (Macro-Cells). The base station antennas and radios for such Macro-Cells are typically mounted on antenna towers. A conventional antenna tower has three or four legs on which antennas and supporting remote radio units (RRUs) are mounted. However, in some environments structures known as "monopoles" are used as mounting structures. A conventional monopole 10 (which is typically hollow) with antennas 20 mounted on mounting frames 30 is shown in FIG. 1. Monopoles are typically employed when fewer antennas/RRUs are to be mounted, and/or when a structure of less height is required.

In addition, Macro-Cell sites are becoming less available, and available spectrum limits how much additional capacity can be derived from a given Macro-Cell. Accordingly, small cell RRU and antenna combinations have been developed to "fill in" underserved or congested areas that would otherwise be within a Macro-Cell site. Deployment of small cells, particularly in urban environments, is expected to continue to grow. Often such small cell configurations (sometimes termed "metrocells") are mounted on monopoles. Different varieties of monopoles may be employed, including some based on a modular design (see, e.g., U.S. Patent Publication No. 2018/0254545), and some that may include some equipment within the cavity of the monopole (see, e.g., U.S. Patent Publication No. 2020/0136236). Both of these documents are hereby incorporated herein by reference in full.

In view of the foregoing, it may be desirable to provide additional monopole arrangements.

SUMMARY

As a first aspect, embodiments of the invention are directed to a base assembly for a monopole. The base assembly comprises: an elongate monopole with a lower end; a base plate with a hole, the lower end of the monopole inserted into the hole; and a reinforcing ring encircling the lower end of the monopole, the reinforcing ring having upper and lower ends. A first weld is present between the upper end of the reinforcing ring and the monopole, a second weld is present between the lower end of the reinforcing ring, the base plate, and the monopole, and a third weld is present between the lower end of the monopole and an outer surface of the hole.

As a second aspect, embodiments of the invention are directed to a base assembly for a monopole comprising: an elongate monopole with a lower end; a base plate with a hole, the lower end of the monopole inserted into the hole;

and a reinforcing ring encircling the lower end of the monopole, the reinforcing ring comprising two pieces and having upper and lower ends. A first weld is present between the upper end of the reinforcing ring and the monopole, a second weld is present between the lower end of the reinforcing ring, the base plate, and the monopole and filling a gap between the reinforcing ring and the base plate, and a third weld is present between the lower end of the monopole and an outer surface of the hole.

As a third aspect, embodiments of the invention are directed to a method of constructing a base assembly for a monopole comprising the steps of:

(a) providing an elongate monopole with a lower end;
(b) inserting the lower end of the monopole into a hole in a base plate;
(c) positioning a reinforcing ring around the lower end of the monopole adjacent the base plate;
(d) welding an upper end of the reinforcing ring to the monopole;
(e) welding a lower end of the reinforcing ring to the base plate and to the monopole; and
(f) welding the lower end of the monopole to an outer surface of the hole of the base plate.

DETAILED DESCRIPTION

Figure 1:
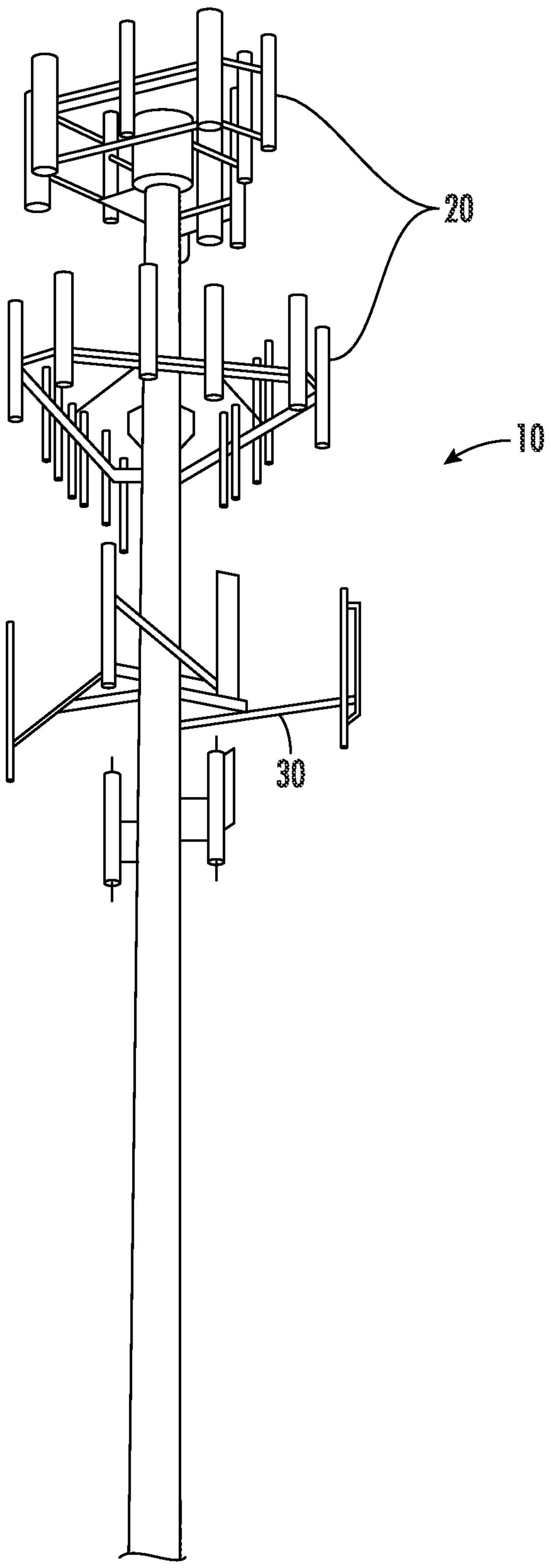
FIG. 1 is a front view of a conventional monopole with four antenna frames and accompanying antennas mounted thereon.

The inventive concepts provided in the present disclosure are described more fully hereinafter with reference to the accompanying drawings, in which embodiments of the inventive concepts are shown. These inventive concepts may, however, be embodied in many different forms and should not be construed as limited to the embodiments set forth herein; rather, these embodiments are provided so that this disclosure will be thorough and complete, and will fully convey the scope of the inventive concepts to those skilled in the art.

Like numbers refer to like elements throughout. In the figures, the thickness of certain lines, layers, components, elements or features may be exaggerated for clarity.

The terminology used herein is for the purpose of describing particular embodiments only and is not intended to be limiting of the inventive concepts. Unless otherwise defined, all terms (including technical and scientific terms) used herein have the same meaning as commonly understood by one of ordinary skill in the art to which these inventive concepts belong. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms “a”, “an” and “the” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, elements, components, and/or groups thereof. As used herein, the term “and/or” includes any and all combinations of one or more of the associated listed items. As used herein, phrases such as “between X and Y” and “between about X and Y” should be interpreted to include X and Y. As used herein, phrases such as “between about X and Y” mean “between about X and about Y.” As used herein, phrases such as “from about X to Y” mean “from about X to about Y.”

It will be understood that when an element is referred to as being “on”, “attached” to, “connected” to, “coupled” with, “contacting”, etc., another element, it can be directly on, attached to, connected to, coupled with or contacting the other element or intervening elements may also be present. In contrast, when an element is referred to as being, for example, “directly on”, “directly attached” to, “directly connected” to, “directly coupled” with or “directly contacting” another element, there are no intervening elements present. It will also be appreciated by those of skill in the art that references to a structure or feature that is disposed “adjacent” another feature may have portions that overlap or underlie the adjacent feature.

Spatially relative terms, such as “under”, “below”, “lower”, “over”, “upper”, “lateral”, “left”, “right” and the like, may be used herein for ease of description to describe one element or feature’s relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as “under” or “beneath” other elements or features would then be oriented “over” the other elements or features. The device may be otherwise oriented (rotated 90 degrees or at other orientations) and the descriptors of relative spatial relationships used herein interpreted accordingly.

Figure 2:
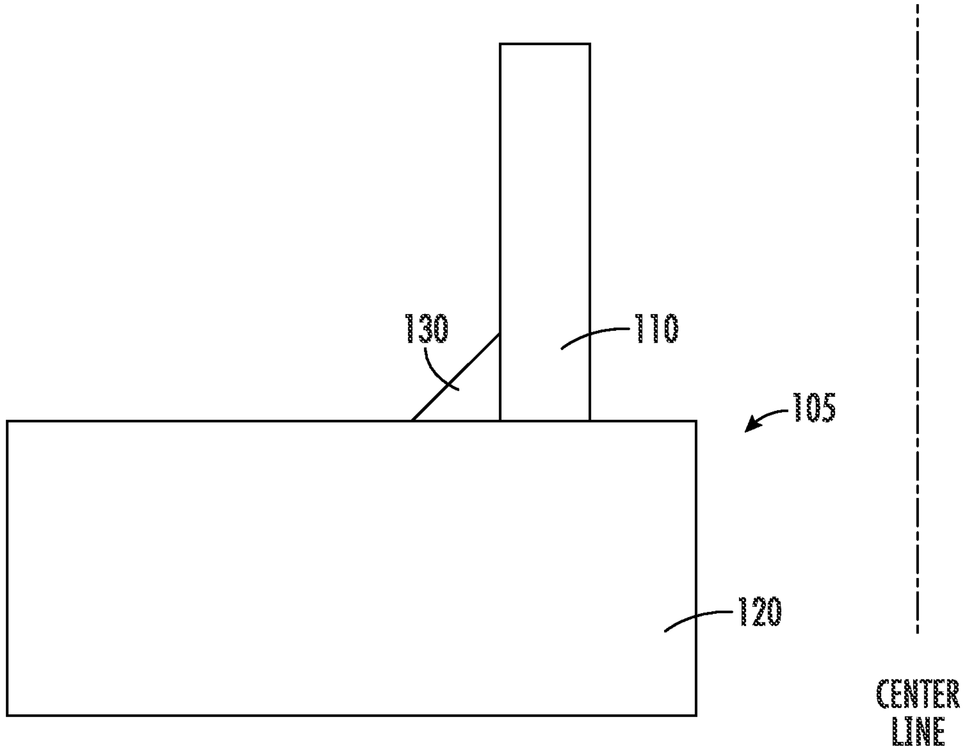
FIG. 2 is a partial side section view of the base assembly of a prior monopole.
Figure 3:
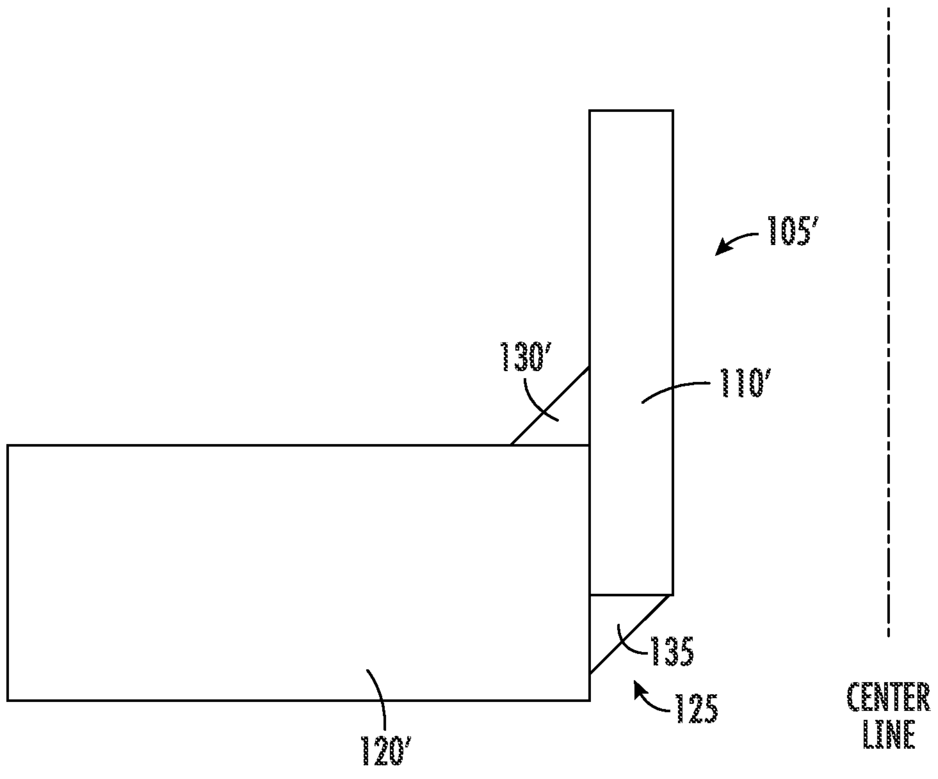
FIG. 3 is a partial side section view of the base assembly of another prior monopole.

Referring now to the drawings, FIG. 2 illustrates a base assembly 105 that includes the bottom portion of a prior monopole as shown in FIG. 1. The monopole 110 is mounted on a base plate 120 and welded thereto via a fillet weld 130 that is applied to the other surface of the monopole 110 and to the upper surface of the base plate 120. FIG. 3 illustrates an alternative prior base assembly 105' with a monopole 110' that is mounted within a hole 125 in a base plate 120'. The monopole 110' is attached via a fillet weld 130' as in FIG. 2 and a second fillet weld 135 applied to the lower edge of the monopole 110' and the inner surface of the hole 125.

Each of the monopole mounting configurations shown above may be adequate for ordinary environmental conditions. However, in areas that may be subject to extended high winds (such as coastal areas prone to hurricanes), it may be desirable to provide a different mounting configuration.

Figure 4:
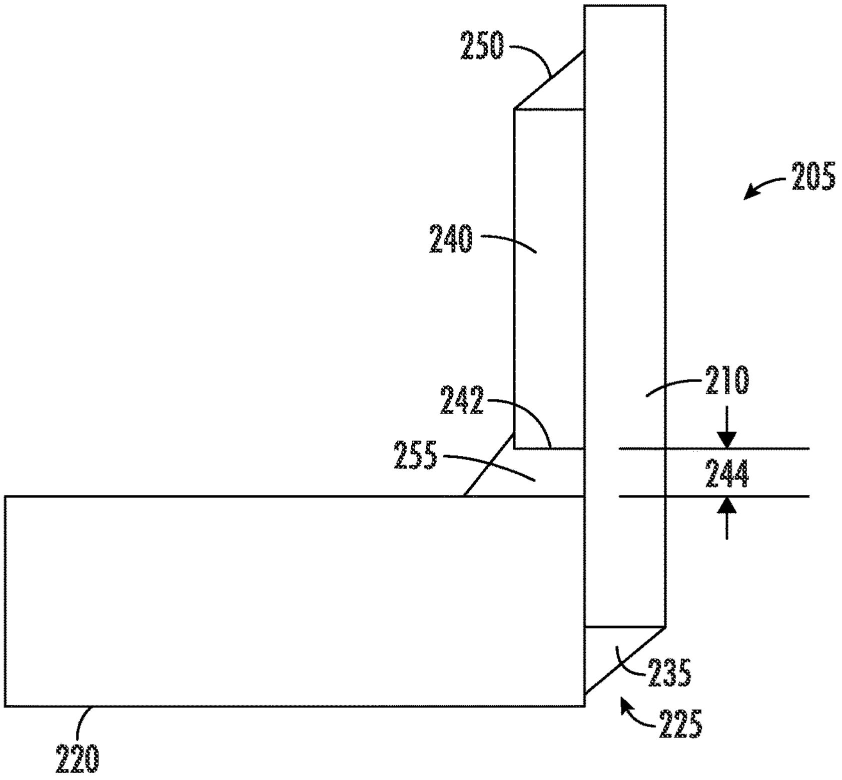
FIG. 4 is a side section view of the base assembly of a monopole according to embodiments of the invention.

Such a base assembly is shown in FIG. 4 above and designated broadly at 205. A monopole 210 illustrated therein fits within a large central hole 225 in a base plate 220. However, a reinforcing ring 240 encircles a lower portion of the monopole 210. In the illustrated embodiment, the reinforcing ring 240 has a flat lower edge 242, and is positioned relative to the base plate 220 so that a gap 244 is present between the lower edge 242 and the upper surface of the base plate 220.

The base assembly 205 is constructed with three separate welds. As with the base assembly 105' above, a fillet weld 235 is applied to the lower edge of the monopole 210 and the inner surface of the hole 225. Also, a fillet weld 250 is applied between the upper edge of the reinforcing ring 240 and the outer surface of the monopole 210. Further, a weld 255 is applied in the gap 244, so that the upper surface of the base plate 220, the lower edge of the reinforcing ring 240, and the outer surface of the monopole 210 are each welded to each other.

The presence of the reinforcing ring 240 can provide additional stability to the base assembly 205 (and, in turn, to the monopole 210 extending upwardly therefrom). In addition, the presence of the three welds 235, 250, 255 can provide an overall increase in weld strength over the assemblies 105, 105'.

Figure 5:
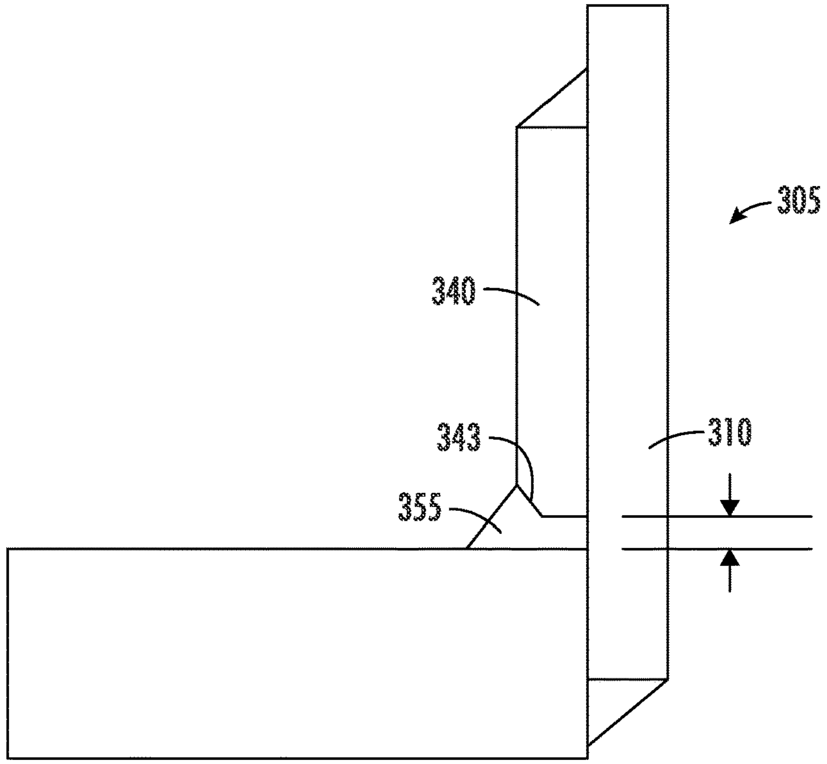
FIG. 5 is a side section view of the base assembly of a monopole according to additional embodiments of the invention.

FIG. 5 illustrates another base assembly 305 that is similar to the base assembly 205, but includes a reinforcing ring 340 with a partially or completely beveled lower edge 343. This configuration may enable the weld 355 between the monopole 310, the reinforcing ring 340 and the base plate 320 to be achieved in a single step, whereas the application of the weld 255 above may require two steps (e.g., a plug welding step followed by a fillet welding step).

Typically, the reinforcing ring 240, 340 is formed of steel. In some embodiments, the reinforcing ring 240, 340 may be formed as a monolithic component; in other embodiments, the reinforcing ring 240, 340 may be formed in multiple pieces (e.g., two pieces), which are then themselves welded together. In certain embodiments, the multiple pieces of the reinforcing ring 240, 340 are formed from flat steel that is rolled to a desired radius of curvature.

Figure 6:
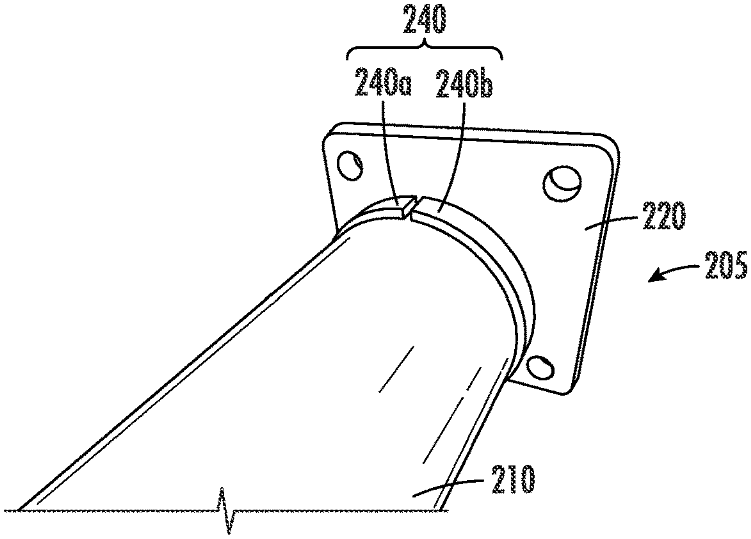
FIGS. 6-8 are partial views of the base assembly of the monopole of FIG. 4 showing some of the steps of manufacture in which the reinforcing ring and monopole are attached to the base plate.
Figure 7:
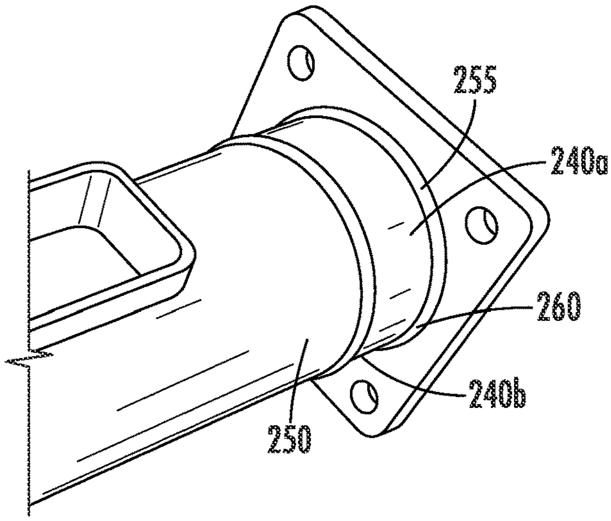
Figure 8:
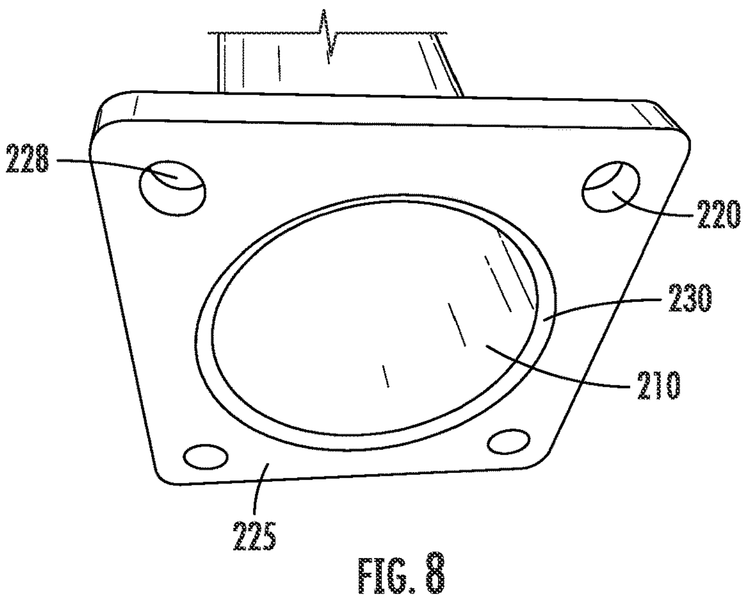

The construction of the base assembly 205 with a two-piece reinforcing ring 240 is shown in FIGS. 6-8. FIG. 6 illustrates the monopole 210 positioned within the hole 225 of the base plate 220, with semi-circular pieces **240*a*, 240*b* of the reinforcing ring 240 overlying the monopole 210 and positioned so that the gap 244 is present between the pieces 240*a*, 240*b* and the base plate 220. Welds 250, 255 are then applied to the assembly 205, as well as two welds 260 (one of which is shown in FIG. 7) that connect the ends of the pieces 240*a*, 240*b* to each other to form the ring 240. Construction is completed with the application of the weld 235 (FIG. 8) to the lower edge of the monopole 210 and the inner surface of the hole 225. The base assembly 205 can then be deployed by mounting the base plate 220 to a foundation (not shown) via bolts inserted through mounting holes 228 in the base plate 220**.

Those skilled in this art will appreciate that the base assemblies 205, 305 described above may take different forms. For example, the monopoles 210, 310 may be hollow and have cavities that are empty, with telecommunications equipment deployed with the monopole 210, 310 being mounted outside of the monopole 210, 310. In other embodiments, some or all of the equipment may be mounted within the cavity of the monopole 210, 310. In some embodiments the monopole 210, 310 may be a monolithic component, and in other embodiments the monopole 210, 310 may comprise multiple components, including modules dedicated to particular equipment (e.g., a power module, a radio module, an antenna module, etc.). The monopole 210, 310 may be of any suitable diameter, with diameters of 10, 14 and 18 inches being typical. In some embodiments, the monopole, base plate and/or reinforcing ring comprise steel.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A base assembly for a monopole, comprising:

an elongate monopole with a lower end;

a base plate with a hole, the lower end of the monopole inserted into the hole; and a reinforcing ring encircling the lower end of the monopole, the reinforcing ring having upper and lower ends;

wherein a first weld is present between the upper end of the reinforcing ring and the monopole; a second weld is present between the lower end of the reinforcing ring, the base plate, and the monopole, and a third weld is present between the lower end of the monopole and an outer surface of the hole.

2. The base assembly defined in claim 1, wherein the second weld fills a gap between the lower end of the reinforcing ring and the base plate.

3. The base assembly defined in claim 1, wherein the lower end of the reinforcing ring is flat.

4. The base assembly defined in claim 1, wherein the lower end of the reinforcing ring is at least partially beveled.

5. The base assembly defined in claim 1, wherein the reinforcing ring comprises two pieces.

6. The base assembly defined in claim 1, further comprising an antenna mounted thereon.

7. A base assembly for a monopole, comprising:

an elongate monopole with a lower end;

a base plate with a hole, the lower end of the monopole inserted into the hole; and a reinforcing ring encircling the lower end of the monopole, the reinforcing ring comprising two pieces and having upper and lower ends;

wherein a first weld is present between the upper end of the reinforcing ring and the monopole; a second weld is present between the lower end of the reinforcing ring, the base plate, and the monopole and filling a gap between the reinforcing ring and the base plate, and a third weld is present between the lower end of the monopole and an outer surface of the hole.

8. The base assembly defined in claim 7, wherein the lower end of the reinforcing ring is flat.

9. The base assembly defined in claim 8, wherein the lower end of the reinforcing ring is at least partially beveled.

10. The base assembly defined in claim 8, further comprising an antenna mounted thereon.

11. A method of constructing a base assembly for a monopole, comprising the steps of:

(a) providing an elongate monopole with a lower end;

(b) inserting the lower end of the monopole into a hole in a base plate;

(c) positioning a reinforcing ring around the lower end of the monopole adjacent the base plate;

(d) welding an upper end of the reinforcing ring to the monopole;

(e) welding a lower end of the reinforcing ring to the base plate and to the monopole; and (f) welding the lower end of the monopole to an outer surface of the hole of the base plate.

12. The method defined in claim 11, wherein step (c) comprises positioning the reinforcing ring such that the lower end of the reinforcing ring is adjacent but spaced apart from the base plate to form a gap therebetween, and wherein step (e) comprises welding the lower end of the reinforcing ring to the base plate and to the monopole to fill the gap.

13. The method defined in claim 11, wherein the lower end of the reinforcing ring is flat.

14. The method defined in claim 11, wherein the lower end of the reinforcing ring is at least partially beveled.

15. The method defined in claim 11, wherein the reinforcing ring comprises two pieces.

16. The method defined in claim 15, further comprising the step of welding the two pieces of the reinforcement ring together.

17. The method defined in claim 11, further comprising the step of mounting an antenna on the monopole.

* * * * *